(12) United States Patent
Chan et al.

(10) Patent No.: US 7,449,163 B2
(45) Date of Patent: Nov. 11, 2008

(54) METHOD FOR PREPARING NANOPARTICLES COMPRISING CERIUM OXIDE AND ZIRCONIUM

(75) Inventors: Siu-Wai Chan, Demarest, NJ (US); Feng Zhang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 600 days.

(21) Appl. No.: 10/506,981

(22) PCT Filed: Feb. 5, 2003

(86) PCT No.: PCT/US03/03393

§ 371 (c)(1),
(2), (4) Date: Oct. 30, 2005

(87) PCT Pub. No.: WO2004/005183

PCT Pub. Date: Jan. 15, 2004

(65) Prior Publication Data

US 2006/0057048 A1    Mar. 16, 2006

(30) Foreign Application Priority Data

May 7, 2002 (WO) .................... PCT/US02/14539

(51) Int. Cl.
*C01F 17/00* (2006.01)
*B01J 23/10* (2006.01)

(52) U.S. Cl. ....................... 423/263; 423/608; 502/304; 502/349

(58) Field of Classification Search ................ 423/263, 423/592.1, 593.1, 594.12, 608; 502/304, 502/349

See application file for complete search history.

(56) References Cited

U.S. PATENT DOCUMENTS

| 5,316,792 A | * | 5/1994 | Harry et al. ................. 427/221 |
| 5,945,575 A | * | 8/1999 | Sigwart et al. .............. 585/531 |
| 2002/0031470 A1 | | 3/2002 | Inagaki et al. |

* cited by examiner

*Primary Examiner*—Wayne Langel
*Assistant Examiner*—James Fiorito
(74) *Attorney, Agent, or Firm*—Baker Botts LLP

(57) ABSTRACT

This invention provides a method for preparing nanoparticles comprising cerium oxide and zirconium and having a narrow size distribution. The method comprises providing a first aqueous solution comprising zirconium oxychloride and providing a second aqueous solution comprising a first component which is either cerium nitrate or hexamethylenetetramine. The second aqueous solution is added to the first aqueous solution to form a first mixture. A third aqueous solution comprising a second component which is either cerium nitrate or hexamethylenetetramine, and which is different from the first component, is added to the first mixture to form a second mixture. The second mixture is maintained at a temperature no higher than about 320° K. to form nanoparticles. The nanoparticles are then separated from the second mixture and sintered in air at a temperature ranging between about 500° and about 1100° C. The nanoparticles obtained by the method of the invention are at least in part crystalline.

24 Claims, 13 Drawing Sheets

METHOD FOR PREPARING NANOPARTICLES COMPRISING CERIUM OXIDE AND ZIRCONIUM

BACKGROUND OF THE INVENTION

1. Field of the Invention

The invention is directed to a method for the preparation of nanoparticles comprising cerium oxide and zirconium. In particular, the invention is directed to a method for the preparation of nanoparticles comprising cerium oxide and zirconium having a narrow size distribution.

2. Background Information

Cerium oxide in the form of fine particles is useful as a catalyst for polymerization, for reforming fuels, and for abating polluting gas in automobile exhaust system. The catalyst acts as an oxygen pressure regulator in the reduction of $NO_x$ to molecular nitrogen, the oxidation of hydrocarbons and carbon monoxide to water and carbon dioxide, and the conversion of $H_2S$ to $H_2$ and S.

Cerium oxide has been used as a catalyst-component for the recombination of hydrogen and oxygen to water in sealed car batteries, for purposes of extending battery life. Cerium oxide is a good ionic conductor and has been used as an electrolyte material of solid oxide fuel cells and gas sensors.

Cerium oxide has high dielectric constant and a high refractive index making the material suitable for optical coatings, as discussed, for example, in Kanakaraju, S., Mohan, S. and Sood, A. K., Thin Solid Films, Vol. 305, Nos. 1-2 (1997), p. 191. Cerium oxide is also of interest as a catalyst in vehicle emissions systems, as discussed in Trovarelli, A., Boaro, M., Rocchini, E., de Leitenburg, C., and Dolcetti, G., Journal of Alloys and Compounds, Vol. 323-324 (2001), p. 584, and has also found use as a solid oxide fuel cell electrolyte material, as reported in Steele, B. C. H. and Heinzel, A., Nature, Vol. 414, No. 6861 (2001), p. 345; in gas sensors, as described in Stefanik, T. S. and Tuller, H. L., Journal of the European Ceramic Society, Vol. 21, Nos. 10-11 (2001), p. 1967; in high-$T_c$ superconductor structures, as discussed in Walkenhorst, Å., Schmitt, M., Adrian, H. and Petersen, K., Applied Physics Letters, Vol. 64, No. 14 (1994), p. 1871; and silicon-on-insulator structures and high storage capacitor devices, as described by Tye, L., El-Masry, N. A., Chikyow, T., Mclarty, P. and Bedair, S. M. Applied Physics Letters, Vol. 65, No. 25 (1994), p. 1030. Because of the relative hardness of the material, cerium oxide nanoparticles are also useful as an abrasive for fine polishing of surfaces of certain materials, such as quartz and silicon.

Some applications may benefit from using monodispersed cerium oxide nanoparticles, due to the possibility of new properties of cerium oxide in the nanodimension. A method and apparatus for the preparation of monodispersed cerium oxide nanoparticles has been described in International Patent Application No. PCT/US02/14539, herein incorporated by reference in its entirety. The small size of cerium oxide nanoparticles is also advantageous because they provide a relatively large surface area, which increases the oxygen storage capacity of cerium oxide. However, the ability of the nanoparticles to store oxygen decreases at high temperatures, such as the temperatures encountered in automotive exhaust systems. This decrease is due to sintering of the nanoparticles at high temperature, which causes at least some nanoparticles to join to form larger particles. As a result of the formation of larger nanoparticles, the overall surface area available decreases.

Nanoparticles of cerium oxide which contain zirconium show increased stability to changes in size upon heating or sintering at high temperatures while retaining all of the beneficial properties and uses of pure cerium oxide nanoparticles discussed above. Such nanoparticles are not only a more thermally stable catalyst than nanoparticles of pure cerium oxide, but also a more effective catalyst than nanoparticles of pure cerium oxide in three-way catalysis and water-gas-shift. The effect of zirconium has been discussed by Mamontov, E., Egami, T., Brezny, R., Koranne, M., and Tyagi, S., J. Phys. Chem. B, Vol. 104, No. 47 (2000), p. 11110, who suggested that the smaller ionic radius of $Zr^{4+}$ (0.84 Å) relative to $Ce^{4+}$ (0.97 Å) may promote the formation of $Ce^{3+}$ ions, which may cause the formation of oxygen vacancies. These vacancies enhance the reactivity of the particles of cerium oxide containing zirconium as a catalyst, as an electrolyte for solid oxide fuel cells, and as a gas sensor.

Several methods have been described for preparing particles of cerium oxide containing zirconium. One approach involves sintering of a mixture of powders of zirconium oxide and cerium oxide above 1400° C. has been described in Fornasiero, P., Monte, R., Di, G., Rao, R., Kaspar, J., Meriani, S., Trovarelli, A. and Graziani, M., Journal of Catalysis, Vol. 151, No. 1 (1995), pp. 168-177, and in Yashima, M., Takashina, H., Kakihana, M. and Yoshimura, M., Journal of the American Ceramic Society, Vol. 77, No. 7 (1994), pp. 1869-74. Both the Fornasiero et al. and the Yashima et al. methods require a very high sintering temperature and produce particles with a large particle size and a very large particle size distribution. Another method involves heating an aqueous mixture of $(NH_4)_2Ce(NO_3)_6$ and $ZrOCl_2.8H_2O$ having a total molar concentration of zirconium ions and cerium ions of 0.005 M at 100° C. for 168 hours, followed by high temperature sintering of the precipitate, as described in Hirano, M., Miwa, T., and Inagaki, M., Journal of Solid State Chemistry, Vol. 158, No. 1 (2001), pp. 112-17. This method involves a very long reaction time and gives a low yield of the nanoparticles. A further approach involves mixing urea, $(NH_4)_2Ce(NO_3)_6$ and $ZrOCl_2.8H_2O$ at 100° C. to obtain a gel, boiling the gel for 8 h at 100° C., aging for a period of several days, and sintering the resulting mixture at 650° C., as described in Kundacovic, Lj. and Flytzani-Stephanopoulos, M., Journal of Catalysis, Vol. 179, No. 1 (1998), p. 203. This approach requires a long period of time for processing the gel and gives low particle yields. All methods described above require temperatures of at least 100° C.

Accordingly, a need exists in the art for an efficient method for preparing significant quantities of nanoparticles comprising cerium oxide and zirconium with a relatively narrow size distribution.

SUMMARY OF THE INVENTION

The above-described need in the art is substantially satisfied by the method of this invention for preparing nanoparticles of cerium oxide and zirconium with a relatively narrow size distribution. In one exemplary embodiment, the method comprises providing a first aqueous solution comprising zirconium oxychloride and providing a second aqueous solution comprising a first component which is either cerium nitrate or hexamethylenetetramine. The second aqueous solution is added to the first aqueous solution to form a first mixture. A third aqueous solution comprising a second component which is either cerium nitrate or hexamethylenetetramine, and which is different from the first component, is added to the first mixture to form a second mixture. The second mixture is maintained at a temperature no higher than about 320° K to form nanoparticles. The nanoparticles are then separated from the second mixture and sintered in air at a temperature ranging between about 500° to about 1100° C.

In another exemplary embodiment, the method comprises providing a first aqueous solution comprising a first component which is either cerium nitrate and hexamethylenetetramine and providing a second aqueous solution comprising a second component which is either cerium nitrate and hexamethylenetetramine and which is different from the first component. The second aqueous solution is added to the first aqueous solution to form a first mixture. The first mixture is maintained at a temperature no higher than about 320° K for about 1 to about 5 hours. A third aqueous solution comprising zirconium oxychloride is then added to the first mixture to form a second mixture. The second mixture is maintained at a temperature no higher than about 320° K to form nanoparticles. The nanoparticles are then separated from the second mixture and sintered in air at a temperature ranging between about 500° to about 1100° C.

The method of the invention gives nanoparticles comprising cerium oxide and zirconium having a relatively narrow size distribution. The nanoparticles require greater thermal energy for particle growth than pure cerium oxide nanoparticles, and are therefore more thermally stable than pure cerium oxide nanoparticles while maintaining similar favorable properties and uses.

The method of the invention has the advantage of being usable to prepare nanoparticles comprising cerium oxide and zirconium in a quantity which is limited only by the size of the mixing vessel. Batches of such nanoparticles up to about 70 gm have been prepared with the method of the invention. This is a very large amount when compared to the scale of nanoparticle synthesis of the prior art. By providing for a fast initial mixing rate and controlling the reaction time, it is also possible to prepare nanoparticles comprising cerium oxide and zirconium within a desired size distribution. The method also has the advantage of providing crystalline nanoparticles.

DETAILED DESCRIPTION OF THE INVENTION

Figure 1:
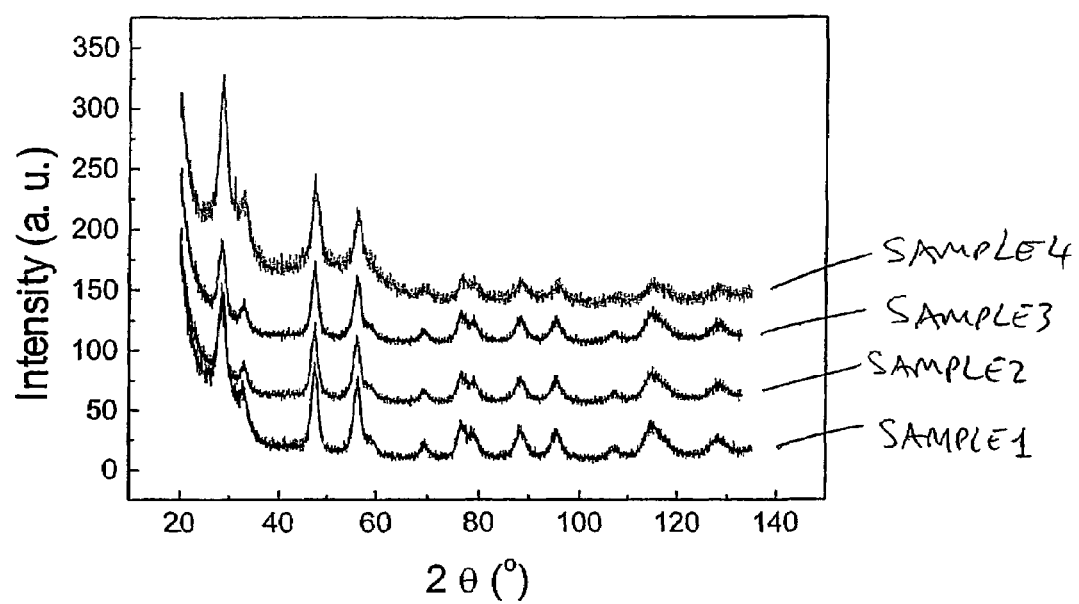
FIG. 1 shows plots of X-ray diffraction data for samples of the nanoparticles obtained in accordance with the procedure described in Examples 1-4 herein.

According to an exemplary embodiment of the present invention, nanoparticles containing cerium oxide and zirconium are prepared by placing in a container a first aqueous solution of zirconium oxychloride, adding to the first aqueous solution a second aqueous solution of either cerium nitrate $(Ce(NO_3)_3 \cdot 6H_2O)$ or hexamethylenetetramine to form a first mixture, and adding to the first mixture a third aqueous solution of the other of cerium nitrate or hexamethylenetetramine to form a second mixture. The second mixture is maintained at a temperature no higher than about 320° K temperature and preferably at about 300° K to form nanoparticles containing cerium oxide and zirconium. The nanoparticles are then separated from the second mixture preferably by centrifugation, and the separated nanoparticles are sintered in air at a temperature ranging between about 500° C. to about 1100° C. The concentration of the cerium nitrate aqueous solution is in the range of about 0.005 M to 0.1 M, and is preferably 0.04 M. The concentration of the hexamethylenetetramine aqueous solution is in the range of about 0.01 M to about 1.5 M, and is preferably in the range of about 0.5 M to about 1.5 M. The concentration of the zirconium oxychloride aqueous solution is in the range of about 0.005 M to about 0.1 M, and is preferably about 0.01 M.

The mixture is continuously stirred with a mechanical stirrer built in the container, while the temperature of the mixture is maintained at about 320° K. The mechanical stirrer has a vertical rotating member positioned about along the vertical axis of the cylindrical container. The vertical rotating member has a plurality of stirring components extending horizontally therefrom. Stirring is performed for a period between about 2 and about 24 hours, preferably between about 5 and about 20 hours. The stirrer mixes the mixture at a rotational speed of about 50 to about 300 rpm for the duration of the reaction, which depends on the desired particle size as discussed above. In addition to controlling the reaction time, the particle size can be monitored by measuring the light absorption Spectrum of the mixture at different reaction times.

In another exemplary embodiment of the invention, initial thorough mixing of the reactants may be achieved as follows. The first solution is first placed in the container. The second and third solutions at a relatively rapid rate are then pumped into the container containing the first solution through a plurality of inlets which are distributed throughout the inner wall of the container, such that turbulence is created in the mixture in the container to ensure initial thorough mixing of the three solutions. In this embodiment of the invention, the container comprises one or more detachable plastic liners which adhere to the walls of the container. The liners are made from a chemically inert material, such as TEFLON®, plastic or polyethylene. Advantageously, the second solution is pumped at high pressure to ensure initial rapid and thorough mixing and nucleation of the nanoparticles at approximately the same time. The nanoparticles grow at a uniform rate and thereby achieve monodispersity. Upon completion of the reaction, the reaction mixture may be centrifuged as described herein, whereby the particles are deposited on the detachable liners covering the inner wall of the mixing vessel. The nanoparticles may then be obtained by detaching the liners from the wall of the mixing vessel.

The size of the nanoparticles obtained from the reaction mixture increases with increasing length of the reaction time. Larger nanoparticles are obtained when the mixing is carried out for about 12 to about 24 hours.

The nanoparticles may be separated from the reaction mixture by centrifugation. In an advantageous embodiment of the invention, the container is positioned inside a centrifuge. The suspension that results from the formation of the nanoparticles in the aqueous medium can be centrifuged at about 9,000 rpm or higher to separate the particles and the supernatant when the particles have reached a desired size. The time required for separation by centrifugation depends on the particle size. In general, the time required is readily calculated from standard centrifugation equations for separating particles from a liquid suspension, as is known to persons of ordinary skill in the art. The process of separation is effective due to the substantial difference in the densities of the supernatant ($\rho \cong 1$ gm/cm$^3$) and of the nanoparticles containing cerium oxide ($\rho \cong 7.2$ gm/cm$^3$) and zirconium oxide ($\rho \cong 5.68$ gm/cm$^3$).

The sintering step is advantageously carried out for about 0.5 hours to about 5 hours, preferably 1 hour, at temperatures ranging between 500° C. and 1100° C. The sintering temperature is ramped up at a rate of 100° C./hour for about 4.8 hours to about 10.8 hours starting with an initial temperature of about 20° C. The sintering temperature is preferably maintained at its maximum value for about 30 minutes, after which the sintering temperature is ramped down at a rate of −100° C./hour for between about 4.8 hours and about 10.8 hours until the nanoparticles return to the initial temperature of about 20° C.

The nanoparticles obtained after centrifugation are at least in part crystalline, and the particle sizes may be measured by X-ray diffraction. All X-ray diffraction experiments may be performed using a diffractometer of model Scintag X2 with Cu Kα irradiation under the same conditions, including the same scan rate (0.025 degree/step, 5 s/step). The lattice parameter a is determined from fitting the x-ray diffraction peak position. A scanning-range of 20 degrees to 135 degrees was used. The mean particle diameter $\chi_0$ is determined from the peak width using the Scherrer formula, $\chi_0 = 0.94 \lambda/B \cos \theta_B$, where $\lambda$ is the wavelength of the Cu K$\alpha_1$ line, $\theta_B$ is the angle between the incident beam and the reflecting lattice planes, and B is the width (in radians) of the diffraction peak. The size dispersion is approximately gaussian with a fall width at the half-maximum value which is about 34% of the mean diameter or less, depending on the sintering temperature. From the x-ray diffraction data, peak positions were found using the Kolaire program as described in Cheary, R. W. & Coelho, A. A., Programs XFIT and FOURYA (1996), deposited in CCP14 Powder Diffraction Library, Engineering and Physical Sciences Research Council, Daresbury Laboratory, Warrington, England. (http://www.ccp14.ac.uk/tutorial/xfit-95/xfit.htm). These positions were used in the Celref program for the determination of the lattice parameter as described in Laugier, J. and Bochu, B., Celref for Windows unit cell refinement program, ENSP/Laboratoire des Matériaux et du Génie Physique, France, and as further described at http://www.inpg.fr/LMPG.

Average particle size was also determined. Peak positions and intensities were compared with the plots in the standard Joint Committee on Powder Diffraction Standards—Powder Diffraction File (hereinafter "JCPDS-PDF") and used for compound identification.

Crystals of the nanoparticles obtained after centrifugation step and before the sintering step do not contain zirconium in the form of zirconium oxide. FIG. 1 shows the X-ray diffraction plot for Samples 1-4 of nanoparticles obtained in accordance with the procedure described in Examples 1-4 herein, which does not include a sintering step. The molar percentage of zirconium relative to the moles of cerium oxide and zirconium was equal to 10%, 20%, 30%, and 40% in the samples obtained in Examples 1, 2, 3, and 4, respectively. The resulting X-ray diffraction plots show that there was no change between the diffraction peaks of pure cerium oxide, obtained from the JCPDS-PDF database and the diffraction peaks of the nanoparticles of Examples 1-4.

Figure 2A:
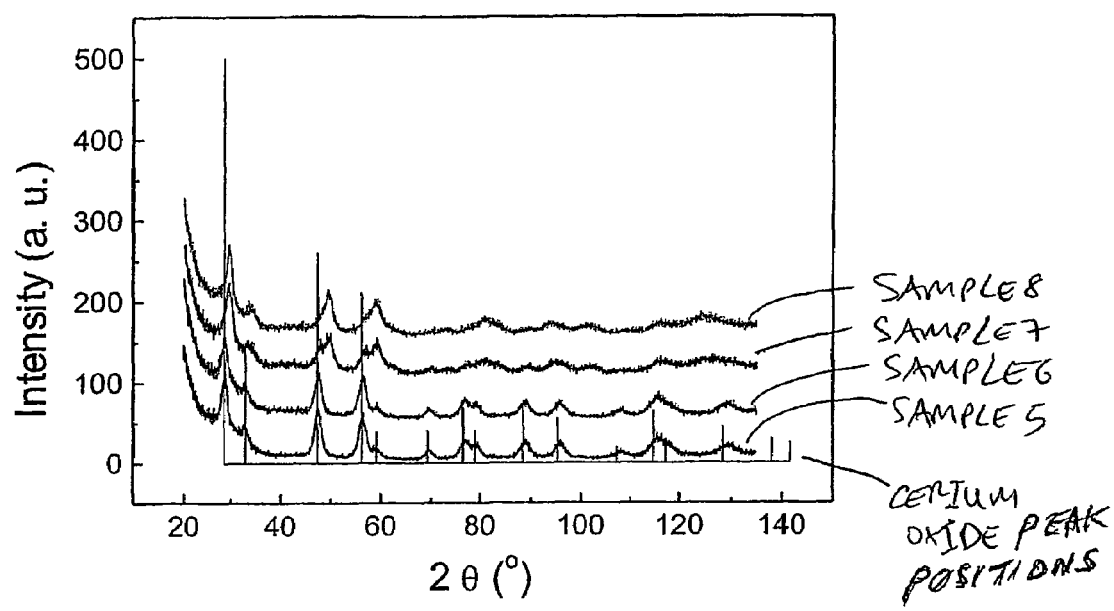
FIG. 2A shows a comparison of the X-ray diffraction peaks for the nanoparticles obtained in accordance with the procedures described in Examples 5-8 herein and the X-ray diffraction peaks of nanoparticles of pure cerium oxide.
Figure 2B:
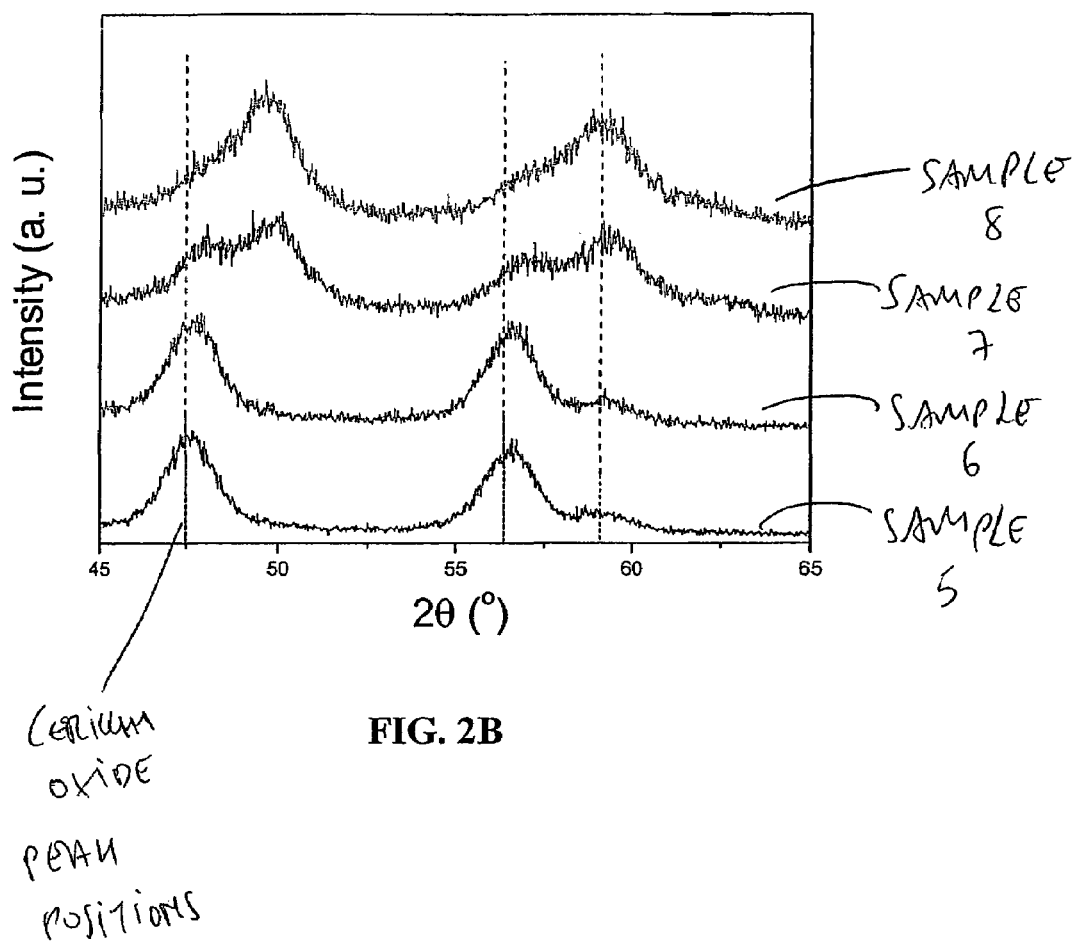
FIG. 2B shows a magnification of the X-ray diffraction peaks of FIG. 2A in the region ranging from $2\theta=45°$ to $2\theta=65°$.
Figure 2C:
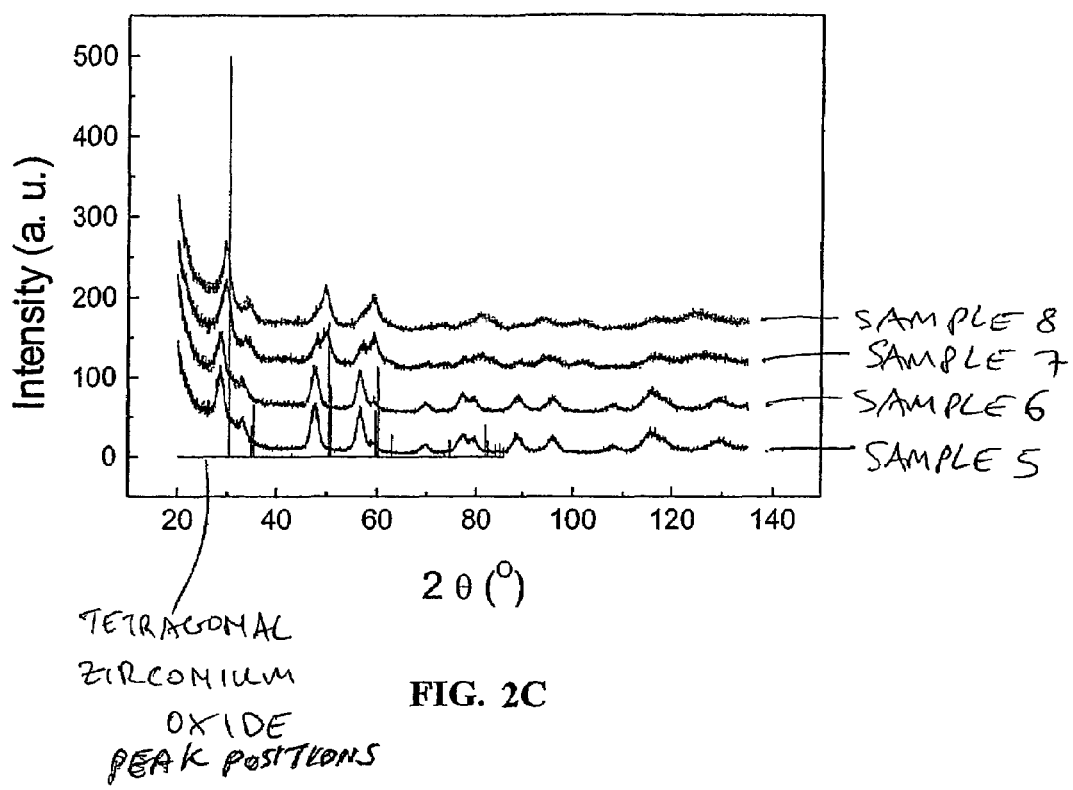
FIG. 2C shows a comparison of the X-ray diffraction peaks for the nanoparticles obtained in accordance with the procedures described in Examples 5-8 herein and the X-ray diffraction peaks of pure tetragonal zirconium oxide.
Figure 2D:
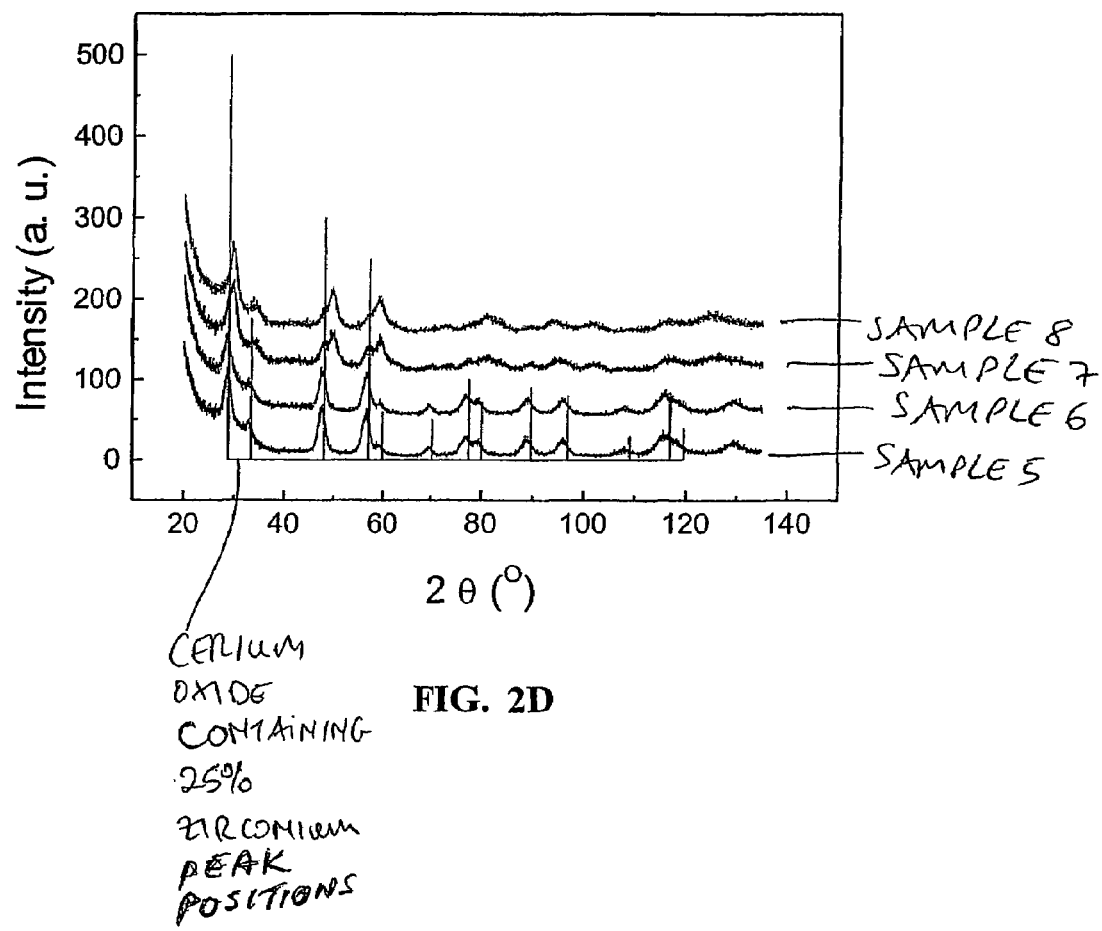
FIG. 2D shows a comparison of the X-ray diffraction peaks for the nanoparticles obtained in accordance with the procedures described in Examples 5-8 herein and the diffraction peaks of particles containing cerium oxide and 25% by mole of zirconium.

If the nanoparticles obtained after centrifugation are subjected to sintering, zirconium is incorporated into the cerium oxide nanoparticles. As described in Examples 5-8 herein, the nanoparticles obtained in Examples 1-4 were subjected to a sintering step at 550° C. to give sintered nanoparticle Samples 5-8, respectively, which contain 10%, 20%, 30%, and 40% zirconium as a molar percentage of the moles of cerium oxide and zirconium. The X-ray diffraction plots of Samples 5-8 are shown in FIGS. 2A-2D together with the vertical lines representing the positions of X-ray diffraction peaks of pure cerium oxide, tetragonal zirconium oxide, and micron-sized particles containing cerium oxide and 25% zirconium, respectively. The diffraction peaks for each of the sintered nanoparticle samples are shifted relative to the peaks of pure cerium oxide (FIG. 2A), as can be clearly seen from the magnification of the X-ray diffraction peaks in the region ranging from 2θ=45° to 2θ=65° shown in FIG. 2B. The diffraction peaks for the sintered nanoparticle samples resemble the JCPDS-PDF peaks for tetragonal zirconium oxide (FIG. 2C) and the JCPDS-PDF peaks for micron-sized particles containing cerium oxide and 25% zirconium oxide (FIG. 2D).

Without wishing to be bound by any mechanism or theory, it is believed that the reaction between cerium nitrate and hexamethylenetetramine gives cerium oxide, and that the reaction between zirconium oxychloride and hexamethylenetetramine gives an unsintered zirconium-containing precursor to zirconium oxide. The X-ray diffraction plot in FIG. 4A for the nanoparticles obtained from Example 13 herein, in which only zirconium oxychloride and hexamethylenetetramine were reacted, is similar to the JCPDS-PDF plot for hexamethylenetetramine, indicating that the unsintered zirconium-containing precursor to zirconium oxide is an amorphous material. Upon sintering, the zirconium oxide is formed and the tetravalent zirconium ions of zirconium oxide diffuse into the cerium oxide lattice and substitute the tetravalent cerium ions. As is further discussed below, as the amount of zirconium incorporated in the lattice increases, the nanoparticles containing cerium oxide and zirconium begin to have both tetragonal and fluorite structures, rather than only the fluorite structure which is more stable for pure cerium oxide crystals.

Figure 3A:
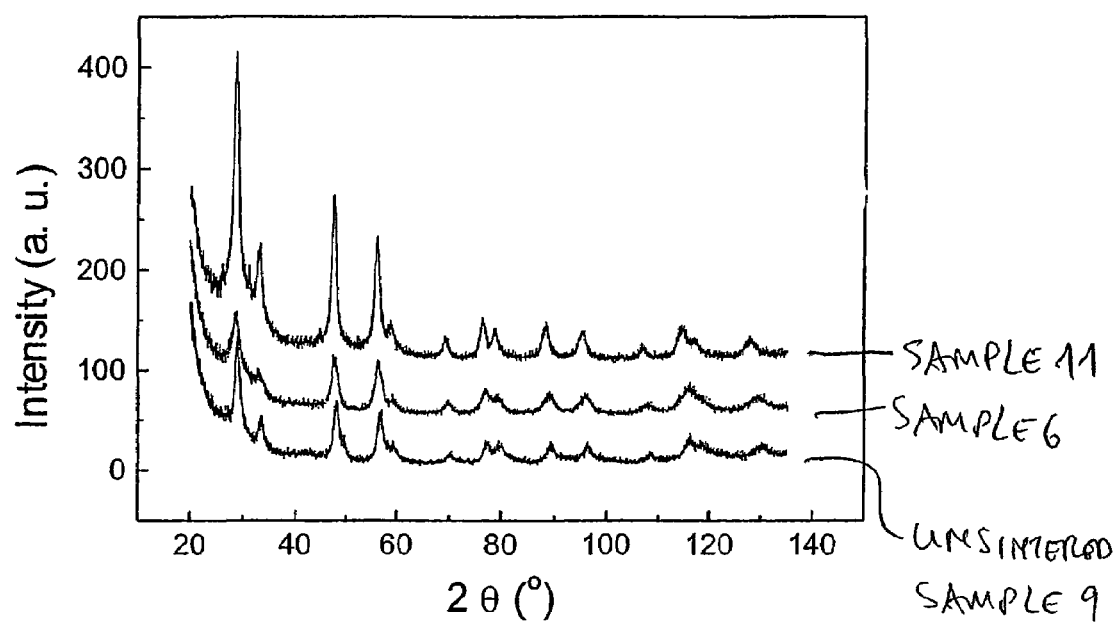
FIG. 3A shows a comparison of the X-ray diffraction peaks for the nanoparticles obtained in accordance with the procedure described in Example 9 herein and the nanoparticles obtained in accordance with the procedure described in Example 11 herein.
Figure 3B:
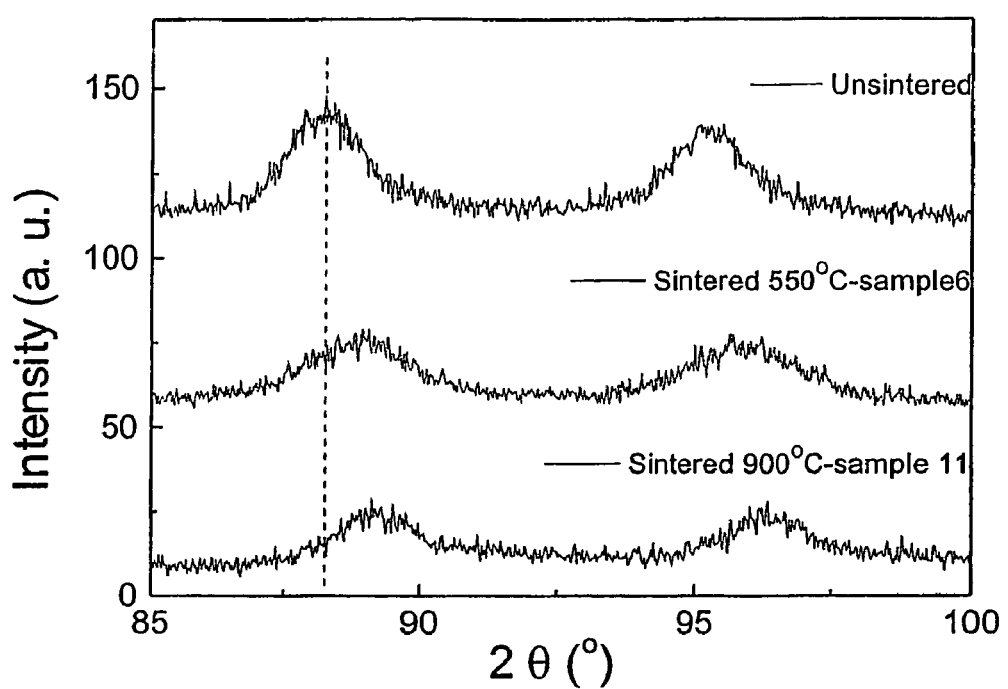
FIG. 3B shows a magnification of the X-ray diffraction peaks of FIG. 3A in the region ranging from $2\theta=85°$ to $2\theta=100°$.

Similar results were found for the nanoparticles obtained in accordance with the procedure described in Example 9 herein, which does not include a sintering step, in which cerium oxide nanoparticles were initially formed by mixing cerium nitrate and hexamethylenetetramine in the absence of zirconium oxychloride. Zirconium oxychloride was then added to the mixture containing the cerium oxide nanoparticles and unreacted hexamethylenetetramine and cerium nitrate. A comparison of the X-ray diffraction plots showed no significant difference between pure cerium oxide, the plot of which is shown in FIG. 2A, and the nanoparticles of Sample 9, obtained in Example 9, the plot of which is shown in FIG. 3A. The Sample 9 nanoparticles were then sintered at 900° C. as described in Example 11 herein to give Sample 11. The resulting X-ray diffraction plot (FIG. 3B) shows shifts in the Sample 11 peaks relative to the peaks of pure cerium oxide shown in FIG. 2A and to the peaks of the nanoparticle Sample 9, indicating that Sample 11 contained zirconium. The peak shifts in Sample 11 can be clearly seen from the magnification of the X-ray diffraction peaks in the region ranging from 2θ=85° to 2θ=100° shown in FIG. 3B. The peak shift in Sample 11 was greater than in the nanoparticle Sample 6, the diffraction peaks of which are shown in FIGS. 2A-D. This difference in shift is believed to be due to the lower sintering temperature (550° C.) used in Example 6 relative to the sintering temperature (900° C.) used in Example 11.

Without wishing to be bound by any theory or mechanism, it is believed that the zirconium oxychloride added to the mixture reacts with hexamethylenetetramine to give a zirconium-containing precursor to zirconium oxide. The formation of this precursor to zirconium oxide is believed to disrupt the formation of the cerium oxide lattice, thereby preventing further growth of the cerium oxide nanoparticles. The particles obtained before sintering include a mixture of the zirconium-containing precursor to zirconium oxide and cerium oxide, and may further contain a mixed oxide of formula $Zr_xCe_{1-x}O_2 \cdot yH_2O$. This compound is formed after the mixing step in our method, where x is between 0 and 1. Upon sintering, the zirconium ions diffuse into the cerium oxide lattice as previously discussed.

Similar results were observed for the nanoparticles of Samples 16 and 17 obtained in accordance with the procedure described in Examples 16 and 17 herein, respectively. Zirconium oxychloride and hexamethylenetetramine were mixed for an amount of time-sufficient to allow formation of a precipitate. Without wishing to be bound by any theory or mechanism, the precipitate is believed to be a zirconium-containing precursor to zirconium oxide. A cerium nitrate solution was then added to the mixture containing the precipitate to form Sample 16. The X-ray diffraction plot of Sample 16 (FIG. 4B) was found to be very similar to the X-ray diffraction plot for pure cerium oxide. Sample 16 was then sintered to form Sample 17. Comparison of the X-ray diffraction plots of Sample 16 and of Sample 17 (FIG. 4B) shows a clear peak shift to larger 2θ values for Sample 17, indicating formation of nanoparticles containing cerium oxide and zirconium in Sample 17.

Figure 5A:
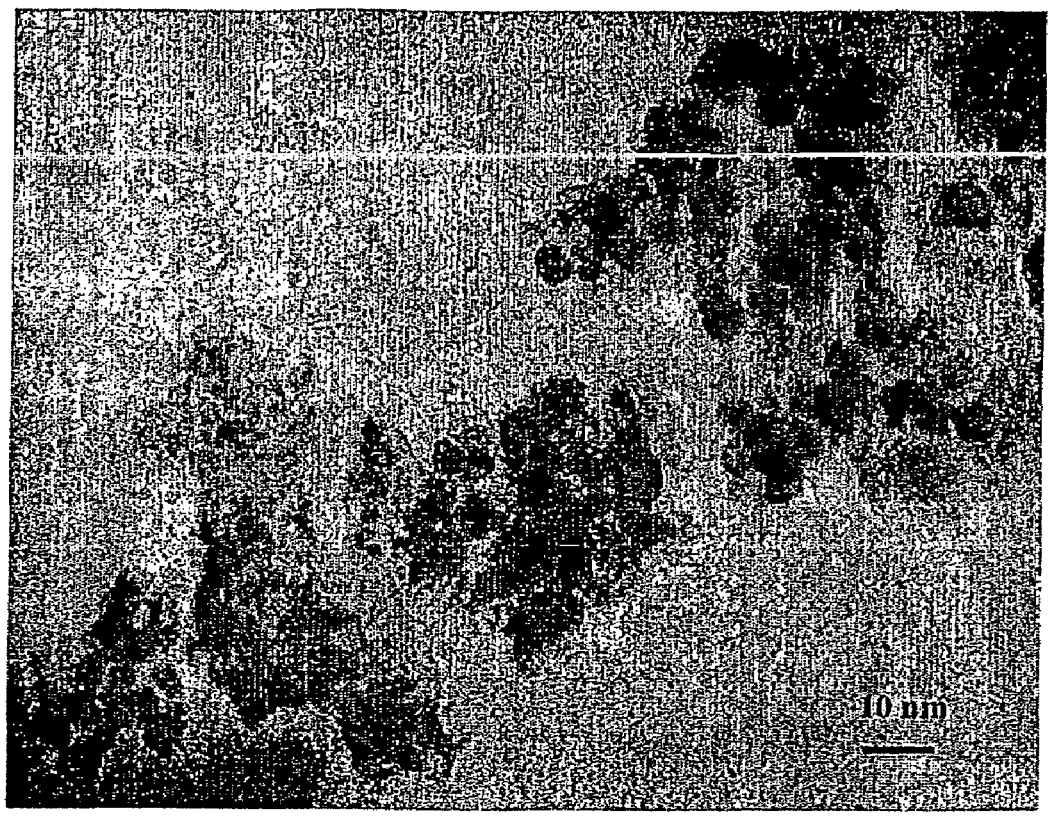
FIG. 5A shows a tunneling electron microscopy (TEM) image for nanoparticles comprising 64 mole-% cerium oxide and 36 mole-% zirconium sintered at 600° C.
Figure 5B:
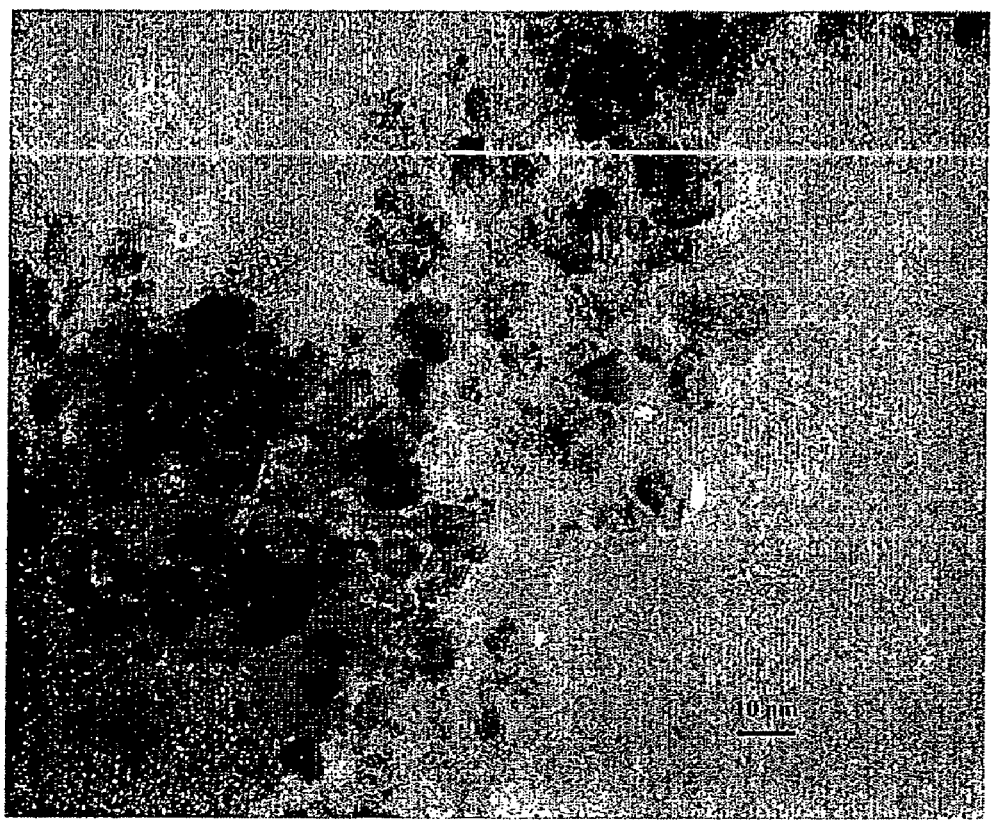
FIG. 5B shows a tunneling electron microscopy (TEM) image for nanoparticles comprising 64 mole-% cerium oxide and 36 mole-% zirconium sintered at 900° C.
Figure 5C:
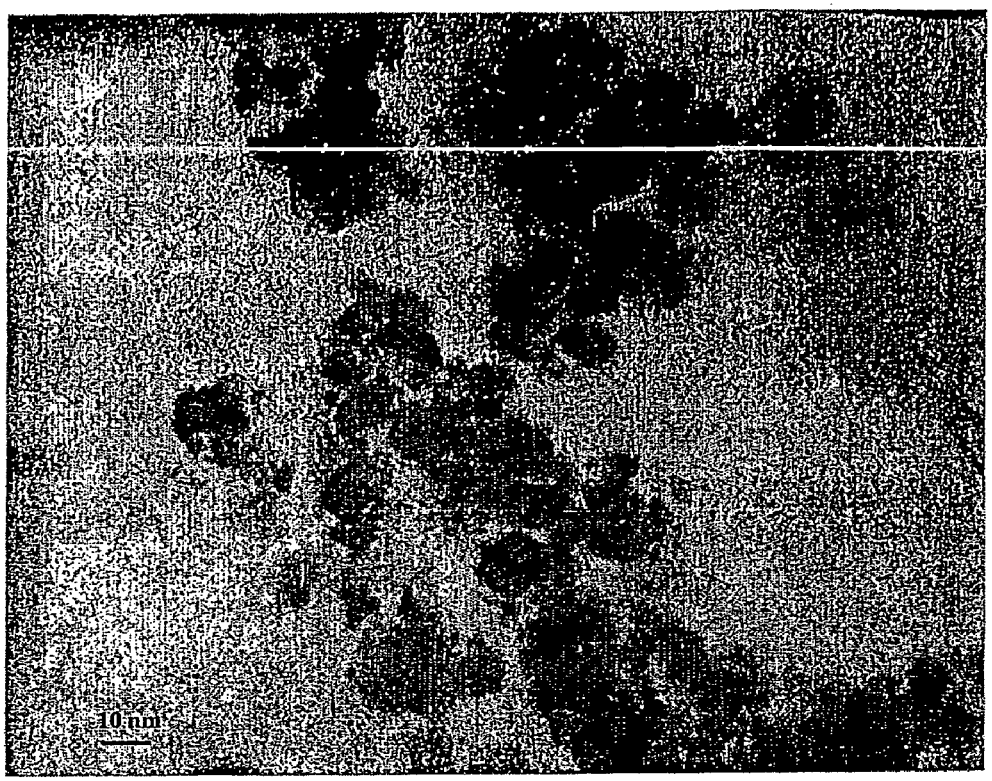
FIG. 5C shows a tunneling electron microscopy (TEM) image for nanoparticles comprising 64 mole-% cerium oxide and 36 mole-% zirconium sintered at 1100° C.

The nanoparticles containing cerium oxide and zirconium obtained after sintering are monodispersed, wherein the term as used herein is intended to mean particles; in which the full width at half maximum (FWHM) of the size distribution peak for a batch of 100 or more particles is less than +/−35% of the median size. FIGS. 5A-5C show tunneling electron microscopy (TEM) images for nanoparticles comprising 64% cerium oxide and 36% zirconium sintered at 600° C., 900° C. and 1100° C., respectively. As shown in Table 1, the diameter of the nanoparticles obtained from TEM is about 6.5 nm for nanoparticles sintered at about 600° C., about 9 nm for nanoparticles sintered at about 900° C., and about 11 nm for nanoparticles sintered at about 1100° C. The monodispersity for the nanoparticles shown in Table 1 varies from about 29% for nanoparticles sintered at about 900° C. to about 34% for nanoparticles sintered at about 1100° C.

TABLE 1

Particle size and size distribution for nanoparticles comprising 64% cerium oxide and 36% zirconium oxide.

| Sintering Temperature (° C.) | Particle Size (nm) | Size Distribution (nm) | Size Distribution (% of median particle diameter) |
|---|---|---|---|
| 600 | 6.45 | ±2.01 | ±31 |
| 900 | 9.18 | ±2.66 | ±29 |
| 1100 | 11.13 | ±3.83 | ±34 |

Figure 6:
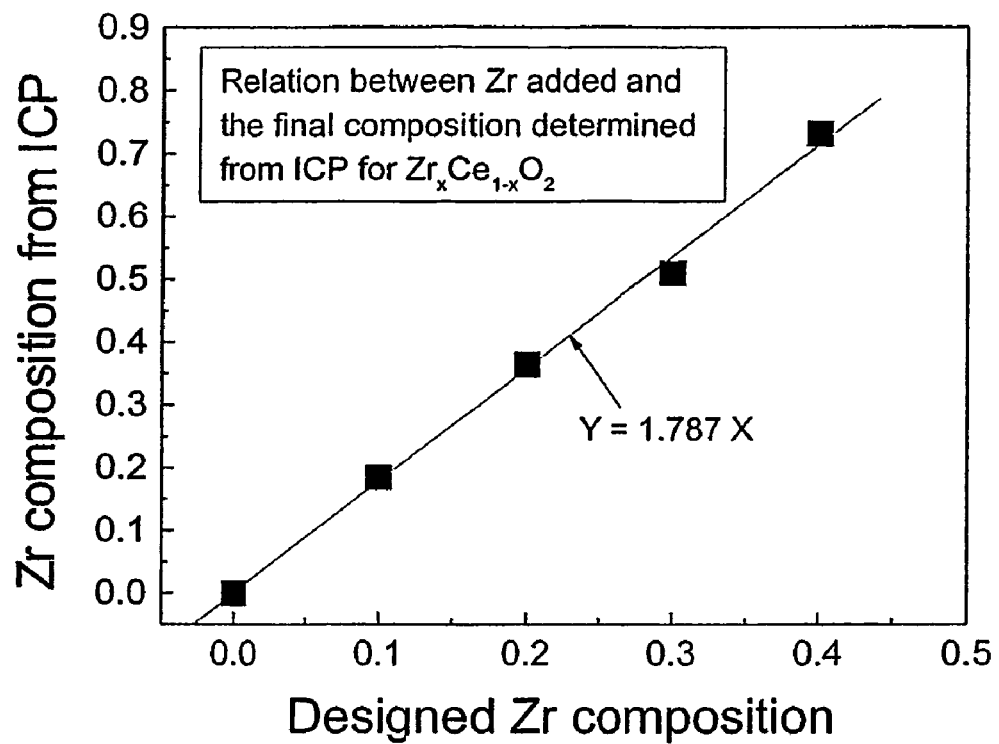
FIG. 6 shows a plot of the actual molar percentage of zirconium in the nanoparticles containing cerium oxide and zirconium versus the molar percentage of zirconium expected on the basis of the initial relative amounts of the reactants zirconium oxychloride and cerium nitrate.

The amount of zirconium which is incorporated into the nanoparticles is larger than the expected amount based on the molar percentages of zirconium oxychloride and cerium nitrate reactants. Without wishing to be bound by any theory or mechanism, the incorporation of a larger than expected amount of zirconium in the cerium oxide nanoparticles is due to the lower pH of a zirconium oxychloride solution relative to a solution of cerium nitrate in an equal concentration. The lower pH corresponds to a greater reactivity of zirconium oxychloride with hexamethylenetetramine. As shown in Table 2, for an initial ratio of zirconium oxychloride and cerium nitrate corresponding to an expected percentage of 20% of zirconium in the nanoparticles, the molar percentage of zirconium in the nanoparticles containing cerium oxide and zirconium was found to be 36% at sintering temperatures of 550° C., 900° C., and 1100° C. The presence of zirconium in the nanoparticles also leads to a reduction in the lattice parameter compared to pure cerium oxide, as shown in Table 2. This reduction is believed to be due to the smaller ionic radius of $Zr^{4+}$ relative to the ionic radius of $Ce^{4+}$. The relationship between expected and actual amounts of zirconium is illustrated in FIG. 6. The slope of the figure is about 1.79, which means that for an expected value of 30% by mole of zirconium, the actual value is about 54%, or more than half of the total amount of oxides in the nanoparticle. This result may explain why the nanoparticles obtained using amounts of zirconium oxychloride corresponding to expected values of 30% and 40% of zirconium have both tetragonal and fluorite structures, rather than only the fluorite structure which is more stable for pure cerium oxide crystals.

TABLE 2

Comparison of Expected and Actual Molar Percentage Composition of Nanoparticles

| Expected composition | Actual Composition (by Inductively Coupled Plasma) | Lattice Parameter a(Å) | Particle Size d(nm) |
|---|---|---|---|
| Pure $CeO_2$ | Pure $CeO_2$ | 5.4330 | 6.1 |
| Pure $CeO_2$ | Pure $CeO_2$ | 5.411 | 5000 |
| 20% $ZrO_2$—$CeO_2$ Sintered-550° | 36% $ZrO_2$—$CeO_2$ | 5.3921 | 5 |
| 20% $ZrO_2$—$CeO_2$ Sintered-900° | 36% $ZrO_2$—$CeO_2$ | 5.3726 | 6 |
| 36% $ZrO_2$—$CeO_2$ | 36% $ZrO_2$—$CeO_2$ | 5.3174 | Micron sized |

TABLE 2-continued

Comparison of Expected and Actual
Molar Percentage Composition of Nanoparticles

| Expected composition | Actual Composition (by Inductively Coupled Plasma) | Lattice Parameter a(Å) | Particle Size d(nm) |
|---|---|---|---|
| Predict from JCPDF 25% ZrO$_2$—CeO$_2$ from JCPDF | 25% ZrO$_2$—CeO$_2$ | 5.349 | Micron sized |

The invention is further described in the following examples, which are intended to be illustrative and not limiting of the scope of the invention.

EXAMPLES

Examples 1-4

Preparation of Unsintered Nanoparticle Samples 1-4

For the preparation of Sample 1, the following aqueous solutions were prepared: 375 ml of 0.072 M cerium nitrate, 375 ml of 0.008 M zirconium oxychloride, and 750 ml of 0.5 M hexamethylenetetramine (HMT). Each of these three solutions was stirred for 20 minutes. The HMT solution and the cerium nitrate solution were then added in rapid succession to the zirconium oxychloride solution. The resulting mixture had molar percentages of 10% zirconium and 90% cerium. This mixture was stirred overnight for approximately 20 hours. The resulting mixture after such stirring was centrifuged at 9000 rpm for 30 minutes to recover the precipitate. The precipitate was then dried in an oven at 40° C. For the preparation of Samples 2, 3 and 4, the same procedure was used with the modification that the molarity of the starting solutions was changed so that the amount of zirconium as a molar percentage of the cerium amount in the final solution was 20%, 30% and 40%, respectively, corresponding to the expected percentage of zirconium in the nanoparticles. All samples were light brown in color.

Examples 5-8

Preparation of Sintered Nanoparticle Samples 5, 6, 7, 8

These samples were prepared by sintering Samples 1, 2, 3 and 4, respectively, according to the following procedure. The temperature was ramped up at a rate of 100° C. per hour for 5.3 hours from 20° C. to bring the temperature up to 550° C. The temperature was held at 550° C. for 1 hour. The temperature was then ramped down at a rate of −100° C. per hour for 5.30 hours to reach a final temperature of 20° C. All samples were yellow in color. The particle diameter of Sample 6 was determined to be ~5 nm, determined by X-ray diffraction.

Examples 9-10

Preparation of Unsintered Nanoparticle Samples 9-10

For the preparation of Sample 9, the following starting solutions were prepared: 0.0356 M cerium nitrate (1.835 g in 150 mL water), 0.0133 M zirconium oxychloride (0.430 g in 100 mL water), 0.5 M HNMT (7.011 g in 100 mL water). Each of these three solutions was stirred for 20 minutes. The HMT solution and the cerium nitrate solution were combined, and the resulting mixture was stirred for 2 hours. The zirconium oxychloride solution was then added and the resulting second mixture had molar percentages of 20% zirconium and 80% cerium. This second mixture was stirred overnight for approximately 20 hours. The second mixture after such stirring was centrifuged at 9000 rpm for 30 minutes to recover the precipitate. The precipitate was then dried in an oven at 40° C. For the preparation of Sample 10 the above procedure was used with the modification that the molarity of the starting solutions were changed so that the zirconium molar percentage in the final solution was 30%. Samples were light brown in color.

Example 11

Preparation of Sintered Nanoparticle Sample 11

Sample 11 was prepared by sintering Sample 9 according to the following procedure. The temperature was ramped up at a rate of 100° C. per hour for 8.8 hours bringing the temperature up to 900° C. The temperature was held at 900° C. for 1 hour. The temperature was then ramped down at a rate of −100° C. per hour for 8.8 hours to reach a final temperature of 20° C. The sample was yellow in color. The particle diameter of Sample 11 was determined to be ~6 nm.

Example 12

Preparation of Unsintered Nanoparticle Sample 12

For the preparation of Sample 12, the following starting solutions were prepared: 0.007 M Cerium nitrate (0.120 g in 100 mL water), 0.003 M zirconium oxychloride (0.0967 g in 100 mL water), 0.05M HMT (0.7011 g in 100 mL water). Each of these three solutions was stirred for 20 minutes. After this time, the HMT solution and Cerium nitrate solution were added to the zirconium oxychloride solution. The resulting mixture had molar percentages of 30% zirconium and 70% cerium. This solution was stirred overnight for approximately 20 hours. The resulting mixture after such stirring was centrifuged at 9000 rpm for 30 minutes to recover the precipitate. The precipitate was then dried in an oven at 40° C. Sample 12 was very light yellow-brown in color.

Example 13

Preparation of Unsintered Nanoparticle Sample 13

For the preparation of Sample 13, the following solutions were prepared: 0.03 M zirconium oxychloride (1.289 g in 100 mL of water) and 0.5M HMT (3.506 g in 100 mL of water). Both solutions were stirred for 20 minutes. After stirring, the HMT solution was added to the zirconium oxychloride solution. The resulting mixture was stirred for 1 hour. A white precipitate slowly formed as the mixture was being stirred. The resulting mixture after such stirring was centrifuged at 9000 rpm for 30 minutes. The precipitate, Sample 13, was left to dry at room temperature.

Example 14

Preparation of Sintered Nanoparticle Sample 14

Figure 4A:
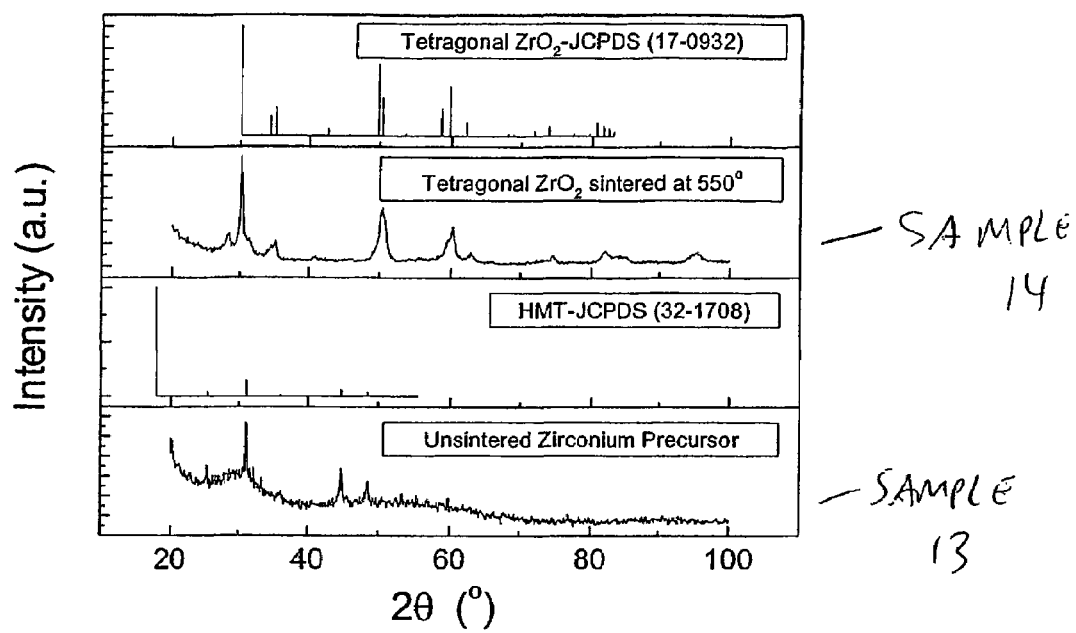
FIG. 4A shows a comparison of the X-ray diffraction peaks for nanoparticles of an unsintered zirconium-containing precursor to zirconium oxide, nanoparticles of zirconium oxide, and the nanoparticles obtained in accordance with the procedure described in Example 14 herein.
Figure 4B:
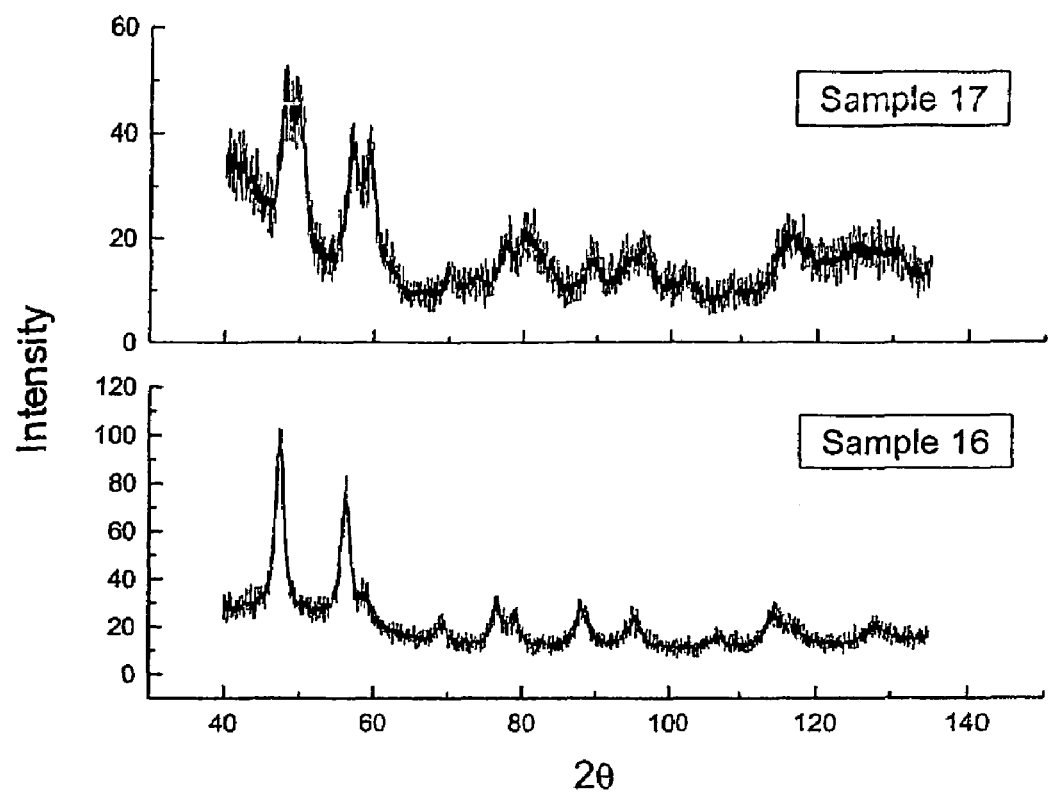
FIG. 4B shows a comparison of the X-ray diffraction peaks for the unsintered nanoparticles obtained in accordance with the procedure described in Example 16 herein and the sintered nanoparticles obtained in accordance with the procedure described in Example 17 herein.

Sample 13, obtained in Example 13, was sintered to form Sample 14 according to the sintering procedure described in Examples 5-8. Sample 14 is tetragonal zirconium oxide, as shown by comparison of X-ray diffraction peaks of the sample with the JPCDS data for tetragonal zirconium oxide (FIG. 4A).

Example 15

Preparation of Sintered Nanoparticle Sample 15

For the preparation of Sample 15, the following starting solutions were prepared: 0.0534 M cerium nitrate (9.175 g in 500 mL water), 0.0133 M zirconium oxychloride (2.1485 g in 500 mL water), 0.5 M HMT (35.055 g in 500 mL water). Each of these three solutions was stirred for 20 minutes. After this time, the HMT solution and cerium nitrate were added to the zirconium oxychloride solution. The resulting mixture had molar percentages of 20% zirconium and 80% cerium. This mixture was stirred for 20 hours. The resulting mixture after stirring was centrifuged at 10000 rpm for 30 minutes to recover the precipitate. The precipitate was then dried in an oven at 40° C. The precipitate was sintered according to the procedure of Examples 5-8.

Example 16

Preparation of Unsintered Nanoparticle Sample 16

For the preparation of Sample 16, the following solutions were prepared: 150 mL of 0.0356 M cerium nitrate, 100 mL of 0.0133 M zirconium oxychloride, and 100 mL 0.5 M HMT. Each of these three solutions was stirred for 30 minutes. The HMT solution and the zirconium oxychloride solution were combined to give a mixture which was stirred for 2 hours. The cerium nitrate solution was then added to the mixture to give a new mixture having 20% molar zirconium and 80% molar cerium. The new mixture was stirred overnight for 20 hours. The new mixture was then centrifuged at 9000 rpm for 30 minutes to form a precipitate and a liquid phase. The precipitate was separated from the liquid phase and dried in an oven at 40° C.

Example 17

Preparation of Sintered Nanoparticle Sample 17

Sample 16, obtained in Example 16, was sintered to form Sample 17 according to the following procedure. The temperature was ramped up at a rate of 100° C. per hour for 5.8 hours bringing the temperature up to 600° C. The temperature was held at 600° C. for 1 hour. The temperature was then ramped down at a rate of −100° C. per hour for 5.8 hours to reach a final temperature of 20° C. The resulting Sample 17 was yellow in color.

It should be understood that various changes and modifications to the exemplary embodiments described herein will be apparent to those skilled in the art without departing from the spirit and scope of this invention, the scope being defined by the appended claims.

We claim:

1. A method for preparing nanoparticles comprising cerium oxide and zirconium, wherein the method comprises the steps of:
   (a) providing a first aqueous solution comprising zirconium oxychloride;
   (b) mixing the first aqueous solution with a second aqueous solution comprising a first component selected from the group consisting of cerium nitrate and hexamethylenetetramine to form a first mixture;
   (c) mixing the first mixture with a third aqueous solution comprising a second component selected from the group consisting of cerium nitrate and hexamethylenetetramine to form a second mixture, wherein the second component is different from the first component;
   (d) maintaining the second mixture at a temperature no higher than about 320° K to form nanoparticles therein;
   (e) separating the nanoparticles formed in step (d) from the second mixture; and
   (f) sintering the nanoparticles separated in step (e) in air at a temperature ranging between about 500° C. to about 1100° C.

2. The method of claim 1, wherein the first aqueous solution has a concentration of zirconium oxychloride ranging from about 0.005 M to about 0.1 M.

3. The method of claim 1, wherein the second aqueous solution comprises cerium nitrate in a concentration ranging from about 0.005 M to about 0.1 M.

4. The method of claim 1, wherein the third aqueous solution comprises cerium nitrate in a concentration ranging from about 0.005 M to about 0.1 M.

5. The method of claim 1, wherein the second aqueous solution comprises hexamethylenetetramine in a concentration ranging from about 0.01 M to about 1.5 M.

6. The method of claim 1, wherein the third aqueous solution comprises hexamethylenetetramine in a concentration ranging from about 0.01 M to about 1.5 M.

7. The method of claim 5, wherein the second aqueous solution comprises hexamethylenetetramine in a concentration of hexamethylenetetramine ranging from about 0.5 M to about 1.5 M.

8. The method of claim 6, wherein the third aqueous solution comprises hexamethylenetetramine in a concentration of hexamethylenetetramine ranging from about 0.5 M to about 1.5 M.

9. The method of claim 1, wherein step (d) comprises stirring the second mixture while it is being maintained at a temperature no higher than about 320° K to form nanoparticles therein.

10. The method of claim 1, wherein the first and second mixtures are formed in a container having a mechanical stirrer, and the first mixture and the third aqueous solution are mixed with the mechanical stirrer to form the second mixture.

11. The method of claim 1, wherein step (e) comprises maintaining the second mixture at a temperature no higher than about 320° K. for a time period between about 2 hours and about 24 hours.

12. The method of claim 11, wherein the time period is between about 5 hours and about 24 hours.

13. The method of claim 12, wherein the time period is between about 12 hours and about 24 hours.

14. The method of claim 1, wherein step (e) comprises centrifuging the second mixture to separate the nanoparticles from the second mixture.

15. The method of claim 1, wherein the second mixture is formed in a container, and the method comprises positioning the container inside a centrifuge and centrifuging the second mixture after formation of the nanoparticles therein for separating the nanoparticles from the second mixture.

16. The method of claim 1, wherein the nanoparticles separated in step (e) are at least in part, crystalline.

17. The method of claim 1, wherein after step (f) is performed, the nanoparticles are at least in part crystalline.

18. The method of claim 1, wherein the sintering of the nanoparticles in step (f) takes place at a temperature of about 550° C.

19. The method of claim 1, wherein the sintering of the nanoparticles in step (f) takes place at a temperature of about 900° C.

20. The method of claim 1, wherein the molar percentage of zirconium in the nanoparticles comprising cerium oxide and zirconium is in the range of about 20% to about 75%.

21. The method of claim 1, wherein the first aqueous solution is provided in a container, and the second and third aqueous solutions are mixed with the first solution and the first mixture, respectively, by pumping the second and third aqueous solutions into the container through a plurality of inlets which are distributed throughout the container.

22. A method for preparing nanoparticles comprising cerium oxide and zirconium, wherein the method comprises the steps of:
- (a) providing a first aqueous solution comprising a first component selected from the group consisting of cerium nitrate and hexamethylenetetramine;
- (b) mixing the first aqueous solution with a second aqueous solution comprising a second component selected from the group consisting of cerium nitrate and hexamethylenetetramine to form a first mixture, wherein the second component is different from the first component;
- (c) maintaining the first mixture at a temperature no higher than about 320° K. for about 1 to about 5 hours;
- (d) after step (c) mixing the first mixture with a third aqueous solution comprising zirconium oxychloride to form a second mixture;
- (e) maintaining the second mixture at a temperature no higher than about 320° K. to form nanoparticles therein;
- (f) separating the nanoparticles formed in step (e) from the second mixture; and
- (g) sintering the nanoparticles separated in step (f) in air at a temperature in the range of about 500° C. to about 1100° C.

23. A method for preparing nanoparticles comprising cerium oxide and zirconium, wherein the method comprises the steps of:
- (a) providing a first aqueous solution comprising zirconium oxychloride;
- (b) mixing the first aqueous solution with a second aqueous solution comprising hexamethylenetetramine to form a first mixture, wherein the first and second aqueous solution are mixed for an amount of time sufficient to allow formation of a precipitate in the first mixture;
- (c) mixing the first mixture with a third aqueous solution comprising a cerium nitrate to form a second mixture;
- (d) maintaining the second mixture at a temperature no higher than about 320° K. to form nanoparticles therein;
- (e) separating the nanoparticles formed in step (d) from the second mixture; and
- (f) sintering the nanoparticles separated in step (e) in air at a temperature ranging between about 500° C. to about 1100° C.

24. The method of claim 23, wherein the first and second aqueous solution are mixed in step (b) for between about 1 hour to about 2 hours.

* * * * *

UNITED STATES PATENT AND TRADEMARK OFFICE
CERTIFICATE OF CORRECTION

PATENT NO. : 7,449,163 B2  Page 1 of 1
APPLICATION NO. : 10/506981
DATED : November 11, 2008
INVENTOR(S) : Siu-Wai Chan et al.

It is certified that error appears in the above-identified patent and that said Letters Patent is hereby corrected as shown below:

On page 1, Column 1, line 6, insert the following header and paragraph:

--Statement Regarding Federally Sponsored Research or Development
This invention was made with government support under grant number DMR9809687 awarded by the National Science Foundation. The government has certain rights in the invention.--

Signed and Sealed this
Thirtieth Day of October, 2012

David J. Kappos
*Director of the United States Patent and Trademark Office*